INVENTOR.
James F. Haskett
BY
Green, McCallister & Miller
HIS ATTORNEYS

Nov. 30, 1965   J. F. HASKETT   3,220,430
CHLORINATING SYSTEM
Original Filed April 22, 1960   5 Sheets-Sheet 2

INVENTOR.
James F. Haskett
BY
Green, McCallister & Miller
HIS ATTORNEYS

Nov. 30, 1965  J. F. HASKETT  3,220,430
CHLORINATING SYSTEM
Original Filed April 22, 1960  5 Sheets-Sheet 3

INVENTOR.
James F. Haskett
BY
Greer, McCallister & Miller
HIS ATTORNEYS

INVENTOR.
James F. Haskett

BY
HIS ATTORNEYS

Nov. 30, 1965  J. F. HASKETT  3,220,430
CHLORINATING SYSTEM
Original Filed April 22, 1960  5 Sheets-Sheet 5

INVENTOR.
James F. Haskett
BY
Green, McCallister & Miller
HIS ATTORNEYS

United States Patent Office 3,220,430
Patented Nov. 30, 1965

3,220,430
CHLORINATING SYSTEM
James F. Haskett, P.O. Box 8, Hartsville, Pa.
Continuation of application Ser. No. 24,053, Apr. 22, 1960. This application May 2, 1963, Ser. No. 280,187
19 Claims. (Cl. 137—114)

This invention relates to a supply system and apparatus suitable for the treatment of a liquid such as water and particularly, to a system for controlling the supply of chemical treatment fluid for the conditioning or chlorination of drinking, swimming pool, sewage, industrial waste water, etc.

This is a continuation of my application Serial No. 24,053 of April 22, 1960, entitled "Chlorinating System," and now abandoned.

Treatment fluid, such as chlorine, is made available in steel cylinders or tanks, so that it may be employed in metered quantities for treatment of various liquids and other uses. The chlorine is compressed in such a cylinder in the form of a gas over a liquid and when dispensed through the top valve of the tank, has a substantially constant pressure, as long as any appreciable amount of liquid remains in the cylinder. It is well known that chlorine, although toxic to the human race in concentrated quantities, is very effective in purifying and disinfecting as well as in conditioning liquids.

In general, the operation of a so-called chlorinator unit involves supplying water under pressure through an ejector to create a vacuum. The vacuum is controlled by regulator means and chlorine gas is reduced from supply pressure to a constant vacuum as it enters the unit. The chlorine is metered and controlled by a rate valve and a differential regulator and is mixed with water at the ejector to form a chlorine solution. When vacuum or negative pressure induced by the ejector is cut-off, the unit should positively shut-off flow of chlorine, in order that the supply of chlorine may be automatically stopped and started by stopping and starting the flow of water. A linear scale flowmeter may be employed to show the quantity of chlorine being fed. Means is required to prevent water-flooding and excessive vacuum in the installation. The mixed chlorine and water may be supplied under reduced flow pressure to the liquid to be treated, for example, in a tank or pool.

Systems of this type have heretofore been rather expensive in their construction, complex in their operating mechanisms, and subject to operating deficiencies. Also, difficulty has been encounter in properly connecting and maintaining a proper connection betwen such a system and piping of the chlorine or treatment fluid supply cylinder. Heretofore it has been necessary to use ball check valves, although they are not too positive in their action, tend to jam in the presence of dirt, and require an accuracy of their positioning to make them properly operative. Further, it is relatively easy to jam a complex valve control mechanism, upset desired operations, and produce reversed and undesired types of flow.

It has been an object of my invention to discover and fully evaluate factors that enter into difficulties heretofore encountered in a system such as here involved and to find a practical solution to the problem presented;

Another object of my invention has been to devise a new and improved form of system and apparatus assembly for supplying treatment fluid in desired metered quantities which will be substantially foolproof and will be relatively simple in its operation and construction;

Another object has been to provide a more practical and inexpensive system;

A further object of my invention has been to devise improved apparatus and valve control mechanism for use in supplying and mixing chemical treatment fluid, such as chlorine, with water supplied under pressure which is utilized in providing a vacuum flow of the treatment fluid;

A further object of my invention has been to devise an improved and simplified water treatment or chlorinator unit;

A still further object has been to devise an improved ejector unit for use in a water treatment system;

These and other objects of my invention will appear to those skilled in the art from the illustrated embodiments of my system and apparatus, the description and the claims.

In the drawings, FIGURE 1 is a side view in elevation showing apparatus and a system of my invention in an operatively connected relationship and illustrating units employed in connection therewith;

Figure 3:
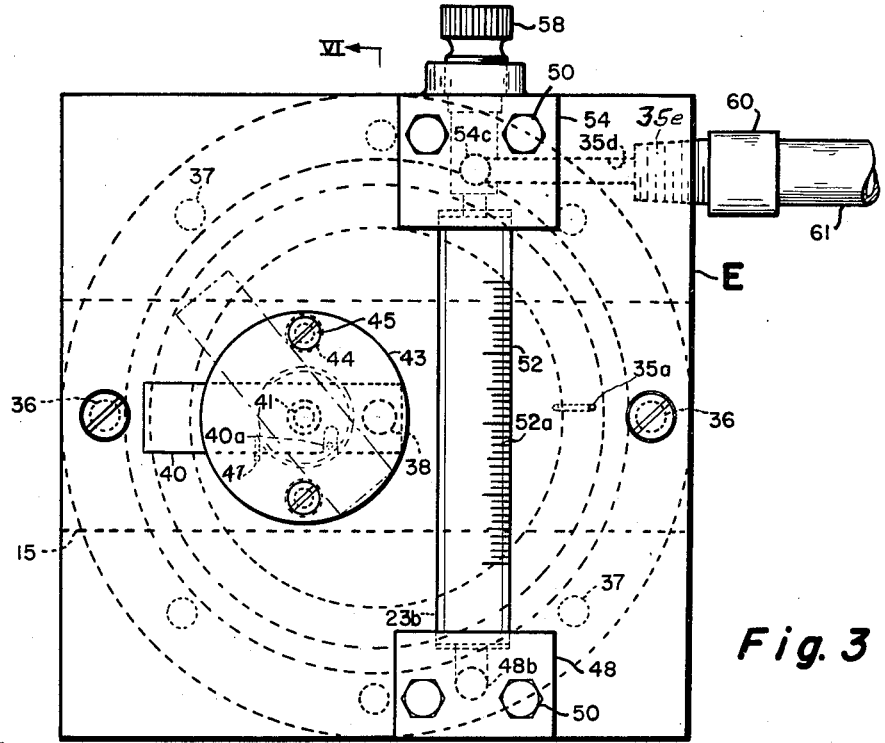
FIGURE 3 is an enlarged view in front elevation of a primary treatment-fluid supply-control or chlorinator unit of FIGURES 1 and 2.
Figure 9:
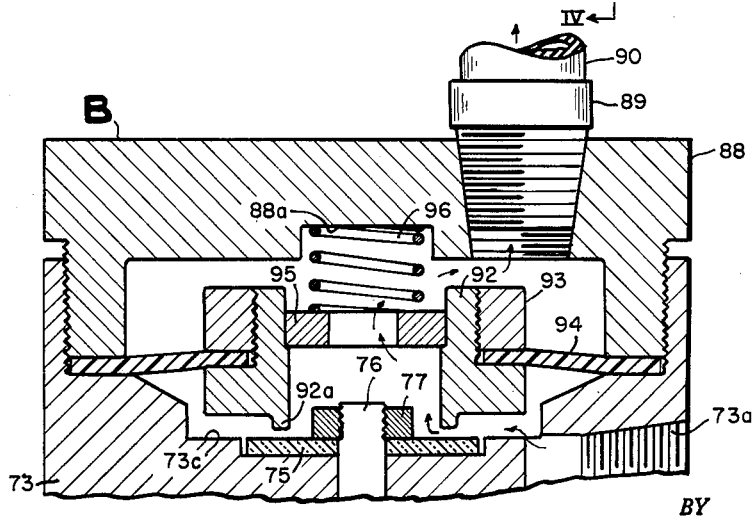
Figure 10:
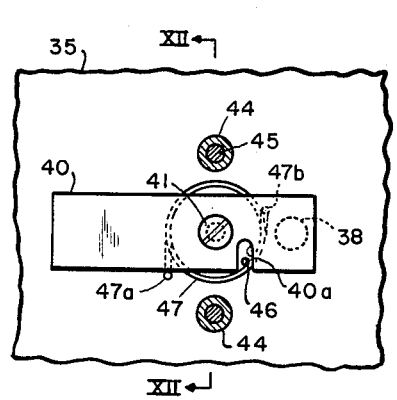
Figure 11:
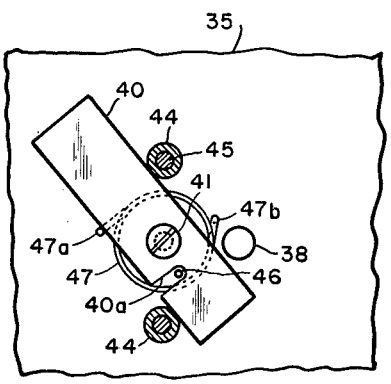
Figure 12:
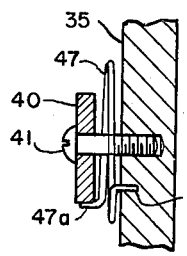
Figure 7:
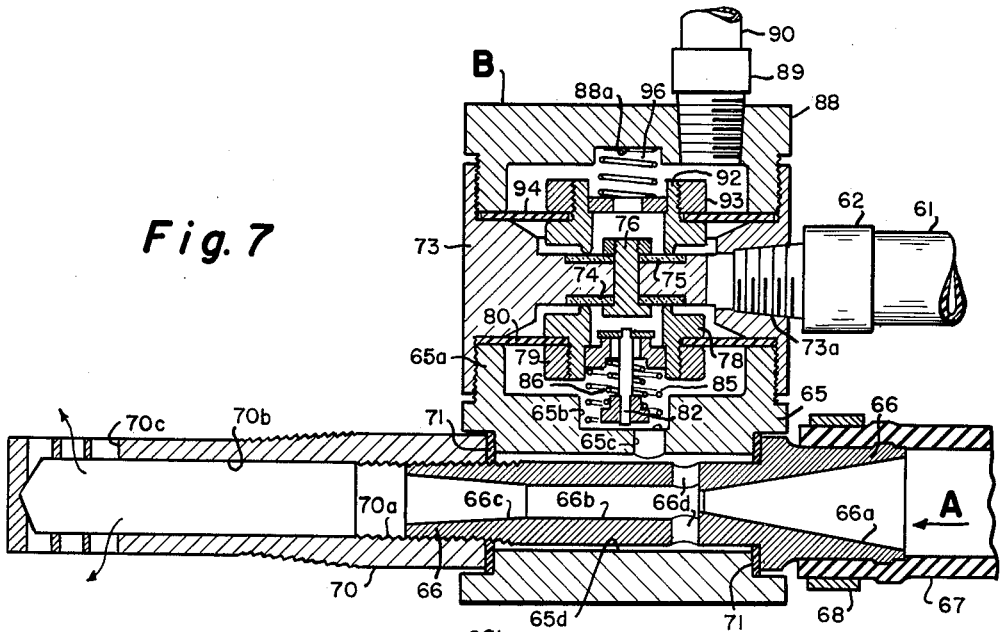
FIGURE 7 is an enlarged sectional view in elevation of a secondary or ejector unit of FIGURES 1 and 2, taken along the line VII—VII of FIGURE 2.
Figure 8:
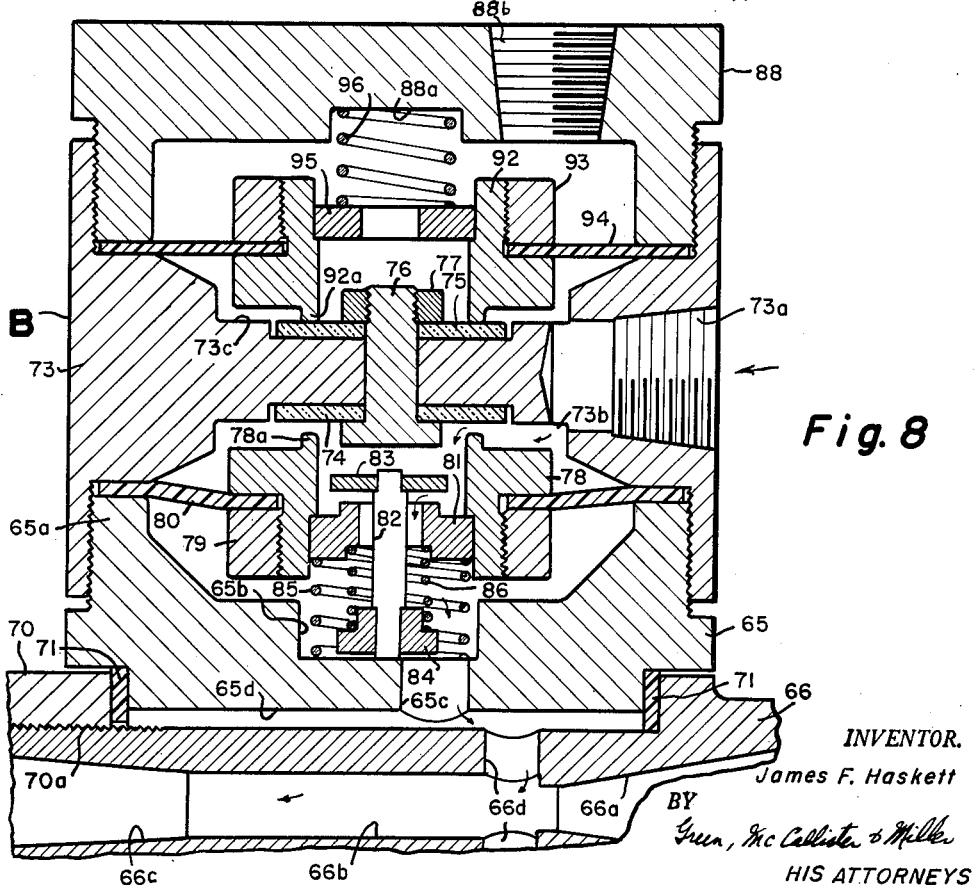

FIGURE 8 is a further enlarged, somewhat fragmental vertical section in elevation, taken along the same line as FIGURE 7, showing the secondary unit with its lower or vacuum-controlled float valve means in an open position and its upper or pressure-controlled float valve means in a closed position, as when treatment fluid, such as chlorine gas, is being passed through the unit; FIGURE 7 shows both the float valve means closed, as occurs when no ejector liquid or water under positive pressure is being supplied by source A;

FIGURE 9 is a vertical fragmental section on the same scale as FIGURE 8 of an upper portion of the secondary unit of such figure, showing the open position of its pressure-release float valve means when the treatment fluid is entering under effective positive pressure; at this time, the lower or vacuum controlled valve means is in the closed position of FIGURE 7;

FIGURE 10 is a front fragment on the scale of FIGURE 3 showing an indicator arm in its normal horizontal position, and FIGURE 11 is a similar view showing it in its oblique or warning position;

And, FIGURE 12 is an enlarged fragmental section taken along the line XII—XII of FIGURE 10.

Figure 1:
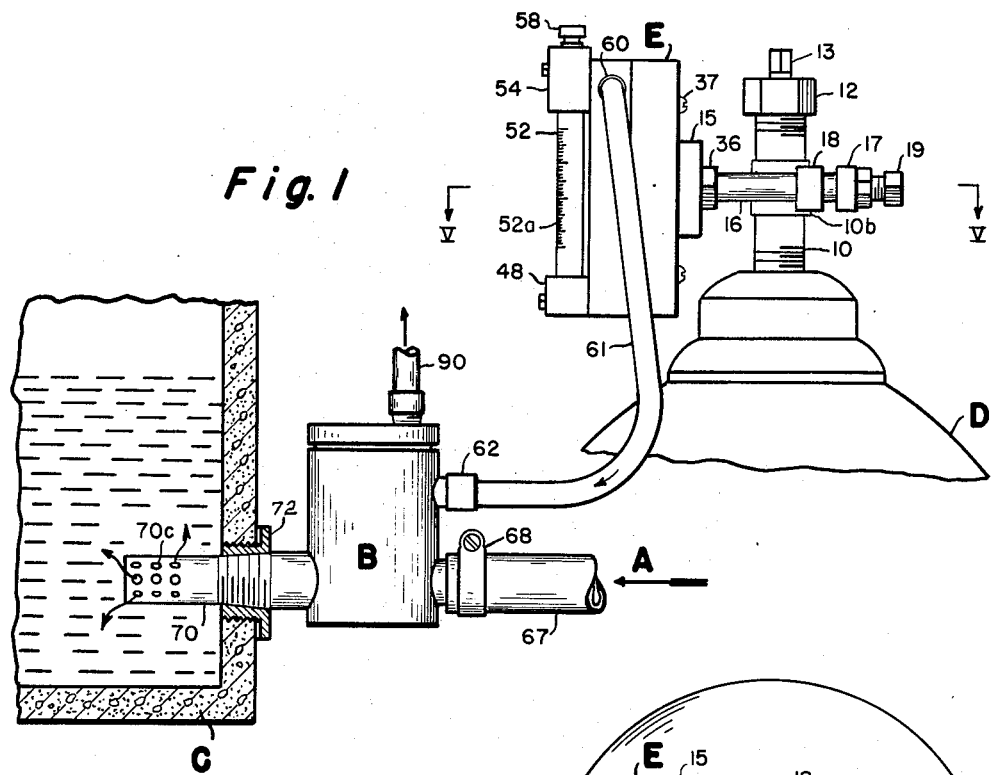
Figure 2:
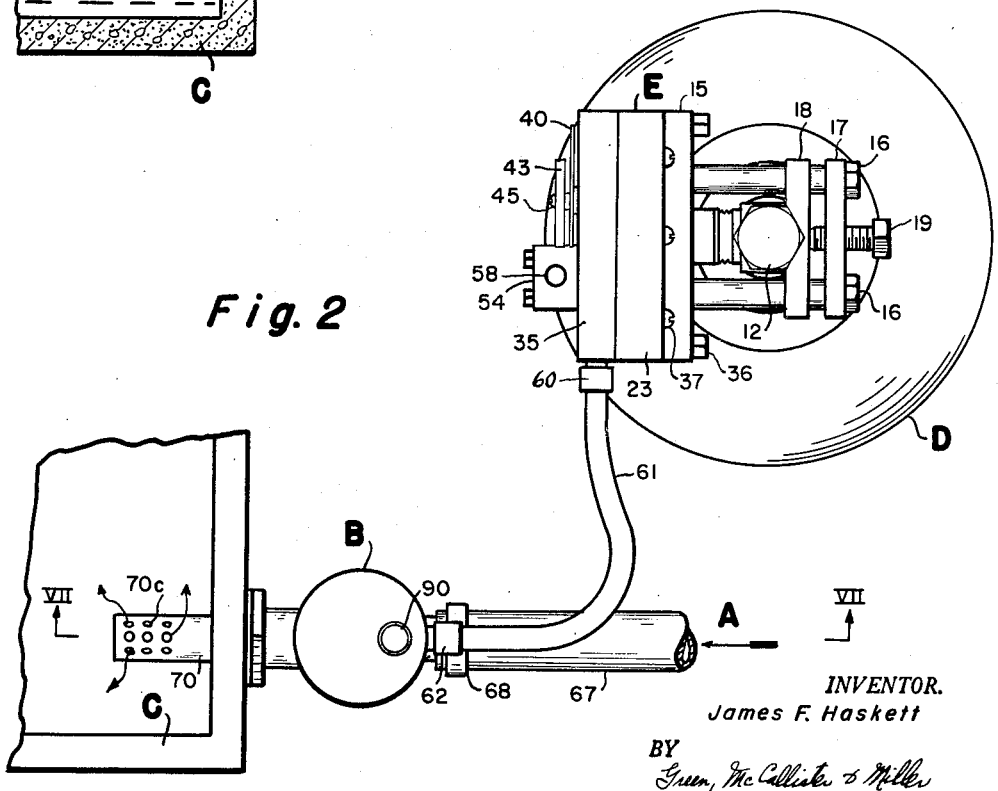
FIGURE 2 is a top plan view of the system and apparatus of FIGURE 1 and on the same scale.

In the illustrated system of FIGURES 1 and 2, A represents a source of liquid, such as clean water, of a temperature below about 100° F. that is supplied under line pressure (for example 20 to 60 pounds per square inch) to a secondary or ejector (eductor) unit B and is therein employed to develop a vacuum for drawing in a treatment fluid (such as chlorine gas) through a primary unit E, from a pressure tank or cylinder D. The liquid is also employed to dissolve or mix with the treatment fluid for introduction into a treatment tank C at a reduced pressure of, for example, ⅓ of the pressure of its supply from the source A. The liquid passes through the secondary unit B which has an ejector to provide the vacuum and which also has a diaphragm float valve means 78 (see FIGURES 7 and 8) that opens when vacuum is developed by ejector (eduction) action and that closes to prevent flooding or back-flow of liquid into the unit B when a vacuum is no longer being set up. In addition, the unit B has an emergency float or diaphragm valve means 92 for bypassing fluid or liquid to a vent if, for some reason, a positive pressure force should be developed. Positive spring loading of the valve means 92 is less than that of the valve means 78, in order that the lower means 78 will be closed when the upper means 92 is open. The unit B includes means for mixing or diffusing the treatment fluid with the entering liquid or water and for directing and discharging it into the bath or treatment tank C.

The secondary unit B has a vacuum outlet portion 73a connected by a fitting 62 and a flexible tubing 61 (see FIGURES 1 and 7) and a fitting 60 to a combined vacuum inlet and treatment fluid outlet portion 35e of the primary unit E. Floating or diaphragm valve means 28 (see FIGURES 4, 5, and 6) is operatively positioned under spring loading within the unit E to normally close-off flow of treatment fluid or chlorine gas from a supply cylinder D. The cylinder capacity determines the maximum rate at which chlorine may be withdrawn, for example, such rate is 50 p.p.d. (pounds per 24 hours) for a 150 pound capacity cylinder and 40 p.p.d. for one of 100 pounds capacity. A plug valve 26 of the valve means 28 is opened when vacuum or suction pressure is applied by the unit B (see FIGURE 5). The unit E also has means for closing-off its valve means 28 when the supply of the treatment fluid has been exhausted; under such a condition, vacuum applied to the underside of valve means 28 becomes more effective, to cause its annular ring 28a to seat on gasket 27 (see FIGURE 6).

The unit E is employed to effect a flow of the treatment fluid to the unit B under a substantially constant regulated or controlled vacuum-induced movement that is based upon an effective pressure differential between the vacuum force or suction pressure exerted by the unit B (which is predominant) and the positive supply force or pressure of the treatment fluid leaving the supply cylinder D. Means 58 is provided for regulating the rate of flow, to indicate the rate of flow (see 52a), and to positively indicate when the supply of treatment fluid has approached exhausting (see 40).

An important feature of my invention is the provision of means to directly install and removably mount the primary unit E on an outlet body for the control or shut-off valve of the supply tank or cylinder D to eliminate connector and adaptor nipples, etc. and any possibility of leakage of the toxic treatment gas during the operation of the unit and the system. In this connection, the unit E (see FIGURES 1, 2 and 5) is positively and securely removably-fastened in an atmospherically sealed-off relationship on a conventional central rectangular body portion 10a of a vertical top or valve outlet pipe or fitting 10 of the cylinder D. Conventionally, a shut-off and control valve is operatively mounted within the body portion 10a and feeds to an integral side or horizontal side outlet portion 11.

An enlarged bore outlet end portion 11a of the side outlet portion 11 is directly axially-aligned to supply or feed treatment fluid, such as chlorine, to a longitudinal bore 20b of an inlet-defining nipple, plug or pipe fitting 20 of the unit E. To provide for positive alignment, the pipe fitting 20 has a backwardly-projecting rim edge 20a which slidably fits within the bore of 11a, as particularly shown in FIGURE 5. A washer-like gasket 21 is interposed between the end face of the outlet portion 11 and an opposed forwardly-offset end face of the inlet pipe fitting 20, so that when the parts 11 and 20 are clamped together under pressure, an effective atmospheric fluid-seal is provided. The outlet pipe 10 is removably secured at its lower end within the mouth of the pressure cylinder D and at its upper end carries a threaded closure cap 12 through which a wrench flat portion of a valve stem 13 extends. It will be noted that the mounting of the unit E is such as to provide plenty of clearance for the wrench flat portion of the stem 13, so that a wrench may be applied thereto to open and close the valve of the pipe 10.

The unit E is provided with a rectangular back mounting plate 15 for the clamping assembly. As shown particularly in FIGURE 5, a pair of transversely-spaced-apart and forwardly-projecting, end-threaded studs 16 are mounted at their threaded back ends 16a in the mounting plate 15.

Threaded forward ends 16b of reduced diameter extend through holes or bores in a cross-bar part or member 17, and are secured thereto by nuts 16c. A slidable clamping bar 18 has holes or bores 18c for receiving enlarged central body portions of the studs 16 to guide the bar 18 therealong. A central back face of the slide claamping bar 18 has an enlarged open bore or inset portion 18a of substantially rectangular configuration to provide a complementary fit over the back end of the body portion 10a. Top and bottom corners 10b of the portion 10a may project or overlap to fit above and below upper and lower sides of the bar 18 (see FIGURES 4 and 5) to retain the bar in an aligned horizontal and vertical position thereon. A central through-bore or offset seating portion 18d projects forwardly from the bore 18a to receive a tapered or offset back end portion 19a of a threaded clamp-adjustment bolt 19.

As shown, the bolt 19 extends through a central, threaded bore of rigidly-secured back cross bar 17, so that positive clamping and holding pressure may be applied to the slide bar 18 and to the front end of the body portion 10a to clamp 11 and 20 in compression against the gasket 21. In this manner, the unit E is given a positively-aligned and securely-mounted relationship, directly on the valve outlet portion 11 of the pipe 10 of the tank D, to directly receive chlorine gas or other treatment fluid therefrom.

The inlet collar or outer plug fitting 20 is centrally mounted at its back end portion of reduced diameter to project backwardly through a bore in the mounting plate 15 into a bore of the same diameter in the back face of a back half or body part 23 of the unit E.

The backwardly-extending portion of outer plug 20 has an annular groove therein to receive an O-ring sealing gasket 22 (see FIGURE 5) for sealing-off the joint between the fitting 20 and the body part or member 23. The plug fitting 20 has a central axial bore 20b therethrough which defines an inlet portion for the primary unit E. The extreme front end portion 20c of the plug fitting 20 has an open bore of reduced diameter to define a seating or stop mounting ledge for an inner, hollow or sleeve plug part or element 25 which extends forwardly therefrom through and projects beyond the front face of the body part or member 23. A soft sealing disc gasket 27 is positioned about the threaded forward end portion of the inner hollow plug or collar 25 to rest upon the front or chamber-defining face of the body part 23. A nut 25a is mounted on the threaded end of the hollow plug 25 to securely hold the gasket 27 in position and retain the plug 25 in a clamped position between the body part 23 and the portion 20c of the outer plug 20.

A disc-like floating valve means, member or part 28 is operatively positioned within an inner control chamber of the unit E which is defined by opposed chamber portions of the back body member 23 and a front body member or part 35. The float member 28 has a forwardly-projecting externally-threaded nose portion to removably receive an internally-threading clamping ring 30. It will be noted from FIGURE 5 that the clamping ring 30 holds the inner peripheral edge portion of a flexible diaphragm 33 of a suitable corrosion-resistant material, such as plastic (resin), tantalum or silver, to project radially-outwardly from the floating part 28. The outer peripheral portion of the diaphragm 33 is held in a securely-clamped relationship between opposed abutment faces of the body parts 23 and 35 by through-projecting nut and bolt assemblies 36. It will be noted that the bolt and nut assemblies 36 project through the back mounting plate 15 to secure it in position against the back face of the back body part or member 23. The diaphragm 33, as thus clamped in position, serves as a fluid seal for the joint defined by the parts 23 and 35 and with respect to the internally-defined chamber of such parts. Threaded mounting screws 37 further supplement the clamping action of the nut and bolt assemblies 36 (see FIGURES 3 and 6); they extend through and removably secure the body parts 23 and 35 together at peripherally-spaced locations thereabout.

The back face of the floating valve member 28 has a backwardly-extending annular seating rim or emergency shut-off valve portion 28a that is adapted to seat upon the gasket 27 when the effective force of vacuum within the chamber increases, due to a fall-off of positive pressure applied to such chamber from treatment fluid entering from the tank D. In other words, when, for example, the supply of treatment fluid or chlorine gas has been exhausted, the pressure will fall-off in the inlet portion of the unit E, so that the vacuum force becomes more effective. As a result, the floating valve 28 is drawn further forwardly (for example, about 5/64 of an inch), until its valve ring portion 28 seats on the gasket 27 and closes-off fluid flow from the unit E at its inlet portion and thus, from the tank or cylinder D (see FIGURE 6). This, as will be hereinafter pointed out, causes an indicator arm 40 to show the necessity for the replacement of the cylinder D. A new cylinder can be inserted in position without disturbing any of the other parts of the system.

Plug valve 26 has a longitudinal stem that is positioned to extend longitudinally along the bore of the inner plug part 25 in an inwardly-spaced fluid passageway-defining relationship therewith. The back end of the plug valve 26 has an enlarged seating head portion 26a that is adapted to seat with and close-off the inlet opening of the bore of the inner hollow plug 25 when no vacuum is being applied to the chamber of the primary unit E (see its closed position of FIGURE 4). The stem of the plug valve 26 extends forwardly to project centrally through the float member 28. Its reduced-diameter forward end portion 26b is fluid sealed-off with respect to the float member 28 by an inset plug gasket 29 that is open to the back face of the member 28 and by a disc-like gasket 39 which is adapted to abut the front face of such member. The extreme end of the stem portion 26b is threaded to removably carry a forwardly-projecting internally-threaded stud 38 thereon.

It will be noted that the stud 38 acts as a clamping nut to securely position the plug valve 26 at its portion 26b with respect to the float member 28. The stud 38 which is shown of rounded or cylindrical shape, is slidably positioned to extend forwardly thorugh a central bore of the front body part 35 and to abut an underface of a position-indicating arm 40. The arm 40 has a leaf tension spring action and may be of phosphorus bronze. The arm 40 (see FIGURES 3 and 5) is pivotally secured by a set screw 41 and soft washer 42 in a spaced-apart relation with the front face of the front body part 35.

As shown particularly in FIGURES 3, 5, 10 and 11, the arm 40 extends to one (left) side of the front face of the body part 35 and has a guide notch 40a to receive a guide pin 46 therein. The pin 46 is secured to project outwardly from the body part 35 and lie within the notch portion 40a to limit the upward movement of the arm 40 to its oblique position of FIGURE 11. A ring-like tension spring 47 is connected at one end 47a (see FIGURE 12) to the arm 40 and at its other end 47b to a small hole in the front face of the body member 35 to move the arm 40 to its upper or oblique position of FIGURE 3 when position-holding tension of the arm 40 has been released by an inward movement of the stud 38. This occurs when the stud 38 is drawn backwardly to a position substantially flush with the front face of the body part 35 when, for example, the float member 28 has moved backwardly until its seating rim portion 28a has engaged the seating gasket 27 (see FIGURE 6). At this time, forward tension on the right-hand extending end of the arm 40 which is exerted by the plug 38 is released, so that the spring 47 will snap the arm upwardly to visually indicate that the pressure in the treatment fluid supply tank D has fallen-off and that the cylinder or tank has to be replaced. A face disc 43, for example, of a transparent material such as clear plastic, is secured by collars 44 and set screws 45 in a spaced relationship forwardly of the arm 40 to protect it and, at the same time, clearly indicate the position of its components to the operator. After a new tank D has been connected and its valve opened, the arm 40 is then manually reset to its horizontal position.

Figure 4:
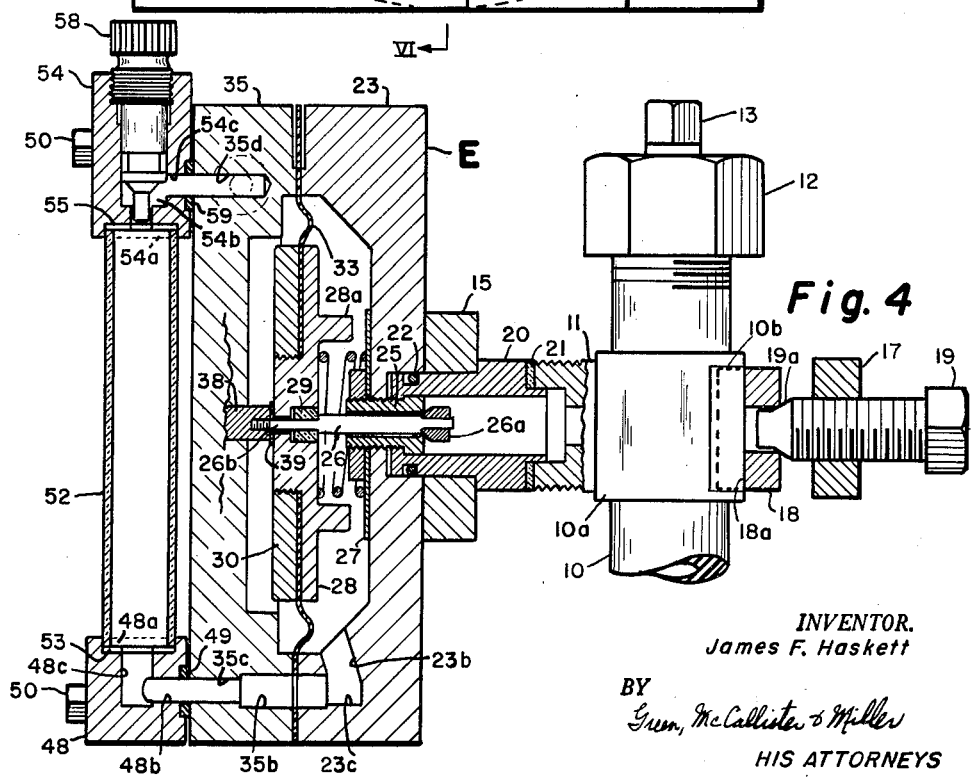
FIGURE 4 is a side section in elevation of the unit of, on the scale of and taken along the line IV—IV of FIGURE 5; the view shows its float valve means in a normal closed position.
Figure 5:
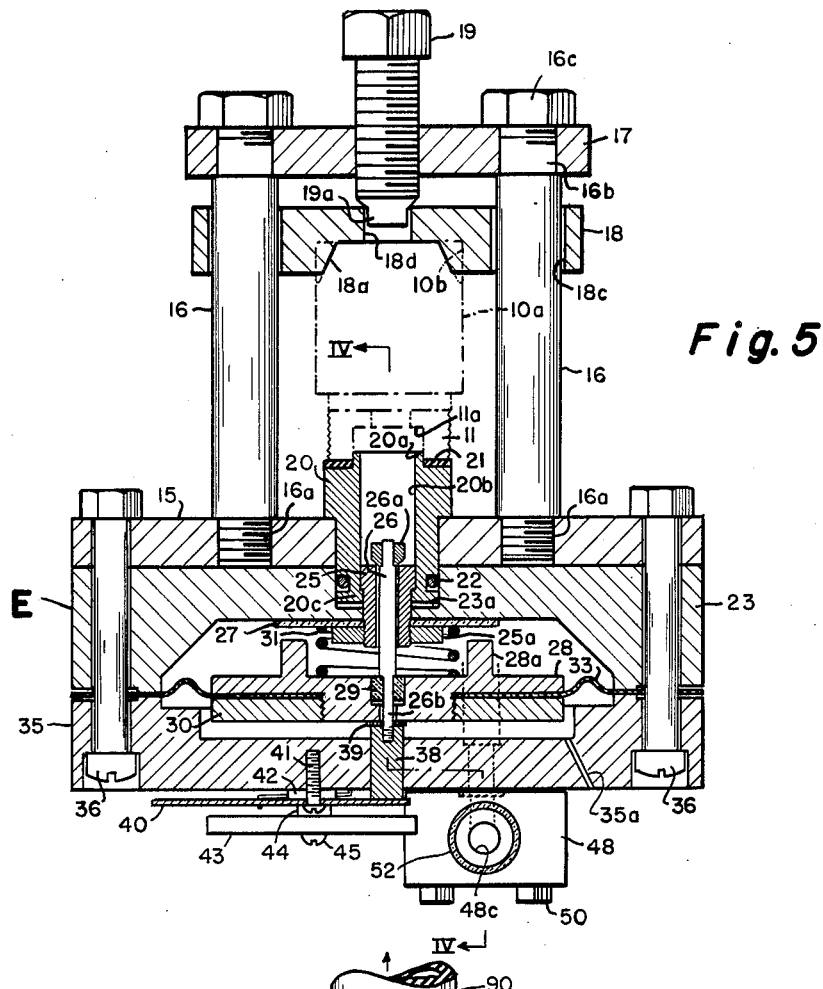
FIGURE 5 is a horizontal section on the scale of FIGURES 3 and 4 and taken along the line V—V of FIGURE 1. This view shows the unit of FIGURES 3 and 4 with its lower float valve means in a normal open, treatment-fluid-supplying position.
Figure 6:
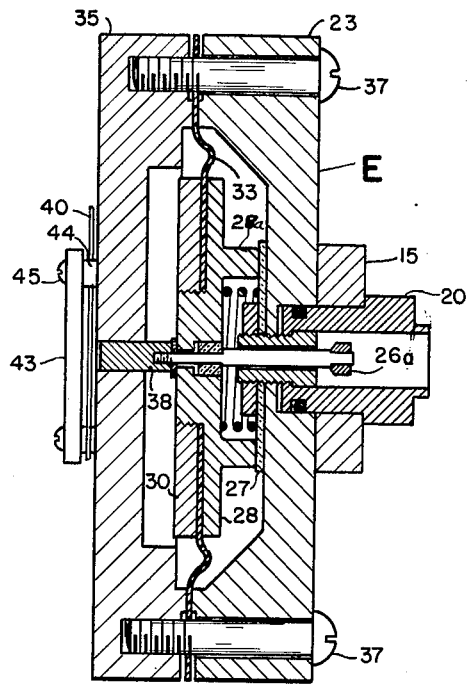
FIGURE 6 is a vertical section on the scale of and taken along the line VI—VI of FIGURE 3; this view shows the floating valve unit in its vacuum-closed position, such as will occur when positive supply pressure of the treatment fluid falls off, as by exhaustion of the supply from cylinder D.

As shown particularly in FIGURES 4 and 5, the diaphragm 30 and its float member 28 divide the control chamber of the unit E into upstream and downstream or opposed halves or side portions. The chamber portion within which the valve ring 28a is positioned may be termed the vacuum or lower pressure chamber side and the opposite side portion may be termed the pressure or higher pressure side which is shown under atmospheric pressure, see the port 35a of FIGURE 5.

A spiral compression spring 31, at its back end, abuts the gasket 27 and at its forward end abuts the back face of the float member 28 to normally urge the member 28 forwardly and close-off the passageway between the bore of plug member 25 and the stem of the plug valve 26 by the valve head portion 26a, so that treatment fluid cannot enter the chamber of the unit E. FIGURE 4 shows this position of the valve assembly. When vacuum is introduced to the vacuum side of the member 28, it moves the member 28 backwardly, for example, about 1/64 of an inch to open the valve assembly (see the position of FIGURE 5) and permit treatment fluid to enter the passageway-defining bore of the hollow plug 25 and flow into the vacuum side of the chamber. FIGURE 4 shows passageway-defining bores 23b and 23c in the back body part 23 which are connected to pasageway-defining bores 35b and 35c of the front body part 35, and to passageway-defining bores 48b and 48c of a bottom positioning mount 48.

The mount 48 is removably secured to the front face of the body part 35 by a pair of threaded bolts 50 and is sealed with respect thereto by a ring gasket 49 that is interposed between the mount and the body part. An enlarged upwardly-open end bore 48a of the mount 48 is connected to the bore 48c and defines a ledge to receive a bottom sealing gasket 53 of a transparent, vertically-positioned sight tube 52. As shown in FIGURE 3, the sight tube is graduated at 52a in a suitable conventional manner to serve as a flow meter by indicating the rate at which chlorine or other treatment fluid is being supplied, for example, the number of pounds of chlorine in a 24-hour period.

The tube 52 defines a vertical passageway upwardly to an enlarged, open, mounting bore portion 54a of an upper mounting part 54. The upper end of the sight tube 52 is sealed-off by a gasket 55 and a fluid-flow passageway of reduced diameter extends from the enlarged bore 54a into a valve positioning bore 54b of the mount 54. The bore 54b is connected to a side bore 54c which leads to and defines a fluid passageway with a bore 35d in the front body part 35. As shown particularly in FIGURE 4, a manually-adjustable plug or needle flow-regulator valve 58 is threadably-adjustably carried by the upper mount 54 to extend downwardly along its central bore 54b to regulate the rate of fluid flow therethrough. The plug regulator valve 58 has a knurled head for facilitating its adjustment. A sealing ring gasket 59 is interposed between the mount 54 and the body part 35 and the former is removably secured to the latter by a pair of threaded bolts 50.

As shown particularly in FIGURE 3, the passageway 35d terminates in a threaded side port 35e which serves as an outlet portion of the unit E and mounts hose fitting 60 therein. As disclosed in FIGURES 1 and 2, the fitting 60 carries the flexible pipe 61 which at its lower end is connected to the vacuum outlet portion of the secondary unit B by fitting 62. The hose 61 and the above-mentioned passageways to the vacuum side of the chamber defined by the unit E, serve both for conducting suction or vacuum pressure from the unit B to the unit E and for conducting treatment fluid flow from the unit E to the unit B.

Referring particularly to FIGURES 7, 8, and 9, the secondary unit B has a lower body part or member 65, an intermediate body part 73, and an upper body part 88 which are removably secured or assembled together as a unit. The lower body part 65 defines a longitudinal passageway chamber in its bore 65d with the outer surface of an ejector part 66 which extends therealong and through opposite ends thereof. A flexible hose 67 is shown secured over a right-hand mounting portion of the ejector part 66 by a clamping band 68 to supply a liquid, such as water under pressure, from the source A to its inwardly-converging inlet throat 66a. The inner end of the throat 66a is longitudinally-aligned with a substantially cylindrical intermediate bore or throat 66b which, in turn, is aligned with an outlet throat 66c which slightly diverges outwardly.

Ring washers 71 are interposed between complementary ledge portions of the lower body part 65 and the ejector body 66 to seal-off the longitudinal chamber therebetween. A cross-bore 66d extends through the ejector body 66 to the longitudinal passageway and constitutes the vacuum passageway from the ejector. The forward end of the ejector body 66 has external screw threads which fit with internal screw threads 70a of a solution delivery nozzle 70. As shown in FIGURES 1 and 7, the forward end of the nozzle 70 has a set of cross-bores 70c to define transverse outlet passageways or delivery openings for the solution into, for example, the tank C of FIGURE 1, an shown in FIGURE 1, an externally and internally threaded screw collar 72 may engage external threads 70b of the nozzle 70 and internal threads of the bore of the tank C to mount the unit B on the tank.

The lower body 65 of the secondary unit (see FIGURES 7 and 8) defines a vacuum chamber with the intermediate body part 73 and has an upwardly-projecting externally-threaded boss or annulus 65a which engages internal threads of a lower annular end flange of the intermediate part 73. In a like manner, the body part 73 has an upper annular end flange that threadably engages a downwardly-projecting annulus of the top body part 88. The lower half or portion of the vacuum chamber is open to longitudinal bore 65b of the body part 65 and the latter is, in turn, open to a smaller transverse or vertical bore 65c which is thus connected with the vacuum passageway defined by the bore 66d of the ejector 66.

A floating valve means, member or part 78 is carried within the chamber defined by the lower and intermediate body parts 65 and 73 through the agency of a flexible diaphragm 80 which may be of plastic material mentioned in connection with the diaphragm of unit E. An internally-threaded ring nut 79 secures the inner peripheral portion of the diaphragm 80 substantially vertically-centrally to project radially-outwardly of the floating valve 78 and divide the vacuum chamber into two sides or halves. The outer peripheral portion of the diaphragm 80 serves as a sealing gasket between opposed abutment portions of the body parts 65 and 73 and supports the valve part 78 in a floatable relationship within the vacuum chamber.

A hollow slide plug 81 is mounted within an enlarged bottom end portion of a central bore of the float valve 78 and is limited in its maximum upward movement by a ledge defined between a smaller upper bore portion and a larger lower bore portion. A valve stem 82 projects vertically along the bore of the slide plug 81 and, at its lower end, has a bottom-positioning boss 84 securely mounted thereon. A valve disc 83 is secured to the upper end of the stem 82 to seat on an upwardly-projecting annular rim or seating edge face of the slide plug 81. An outer spiral compression spring 85 having an expansion force action, at its upper end, abuts the under-surface of the slide plug 81 and, at its lower end, abuts the base of a lower bore 65b of the part 65 to normally hold the plug 81 in its upper position of FIGURE 7, such that it seals-off the passageway between its sealing rim and the valve disc 83.

A stronger, inner, spiral, expansion-force-exerting spring 86 is, at its upper end, mounted within an under-inset or enlarged, open-end bore portion of the plug 81 and, at its lower end, abuts against the base mounting boss 84 of the valve stem 82 to normally urge the latter downwardly and thus, urge the valve disc 83 towards a closing relationship with the seating rim of the slide plug 81. There is thus a normal dual-resilient closing action between the valve disc 83 and the annular seat of the plug 81.

When, as shown in FIGURE 8, vacuum or suction pressure is set up by the ejector 66, then such vacuum tends to draw the diaphragm 80 downwardly against the resiliency of the outer spring 85 and thus draw the slide plug 81 downwardly out of engagement with the valve disc 83. As a result, a vacuum connection is made from the lower to the upper side of the vacuum chamber, to the threaded, nipple-receiving portion 73a of the intermediate body part 73.

As shown in FIGURES 7 and 8, the float valve member or part 78 has an upwardly-projecting seating rim 78a which is adapted to engage a disc-like seating gasket 74 when, as shown in FIGURE 7, no vacuum is being applied to the underside of the vacuum chamber. As a result, there is a dual-closing action as to the passage of fluid through the vacuum chamber until vacuum is applied to the underside of the diaphragm 80.

The intermediate body part or member 73 carries a pair of disc-like seating gaskets 74 and 75 on its upper and lower faces and defines a pressure chamber between its upper face and the upper body part 88. A headed bolt and nut assembly 76, 77 extends through the central portion of the body part 73 to securely hold the gaskets 74 and 75 in position. The upper or pressure chamber of the secondary unit B also has a floating valve assembly which comprises a floating valve member 92, a pressure-sensitive diaphragm 94, and a threaded ring 93 that mounts the inner peripheral portion of the diaphragm 94 substantially vertically-centrally of the floating valve part 92. A hollow slide plug part 95 is operatively positioned within an enlarged upper bore portion of the float valve 72 in abutment with a ledge defined by the upper bore portion and a smaller, lower bore portion thereof.

It will be noted that the diaphragm 94, at its outer peripheral portion, is secured between opposed ledge portions of the body parts 73 and 88 to thus support the float valve part 92 and separate the pressure chamber into upper and lower or opposed halves. The slide plug 95 has a central port therethrough leading to opposite sides of the float valve part 92. A spiral compression spring 96 (exerting an expansion force), at its upper end, is seated within an inset portion 88a of the body part and, at its lower end, is seated against the slide plug 95 to normally resiliently urge a downwardly-projecting annular seating rim 92a of the valve part 92 into a seated, fluid-flow closed-off position with the gasket 75. A pressure outlet vent port 88b leads from the upper portion of the pressure chamber to receive a connection nipple 89 for a flexible vent hose 90. The hose 90 may lead to some remote location or may be buried.

The floating valve 92 is only open when positive pressure is exerted within the outlet port 73a to thus vent positive fluid pressure, as distinguished from a suction pressure flow of the treatment fluid, such as chlorine, from the unit E. It is a safety means for the unit B. FIGURE 9 of the drawings shows an open venting flow relationship of the upper floating valve 92. At the same time, due to the greater tension strength of its spring 85, the lower float valve means 78 will remain closed and prevent the flow of toxic treatment fluid to the ejector 66. It will be noted that chlorine being introduced into the ejector 66 through the port 66d mixes with the liquid while it is in somewhat of a turbulent condition to provide a fully mixed or dissolved solution for delivery from the nozzle 70.

When, as contemplated, a somewhat corrosive treatment fluid, such as chlorine, is to be used, the parts or portions of my system coming into direct contact therewith will be of a resistive resin or metal. For example, a polyvinyl chloride (such as Uscolite) has an excellent resistance and is suitable for fittings, working parts, valves, body parts, etc.; a tetrafluoroethylene polymer (such as Teflon) is chemically resistant and heat stable and is suitable for gasket and packing material; a polymer of trifluorochloroethylene (such as Kel–F) is suitable for the diaphragms; and a synthetic rubber copolymer of hexafluoropropylene and vinylidene fluoride (such as Vitron) is suitable for a gasket such as 29. Internal springs of a silver-plated nickel-base alloy or tantalum alloy, a plug valve 26 of silver alloy and a regulator valve 58 of resin or tantalum have also been found to be suitable.

It will be noted that the vacuum valve mechanism of the secondary or ejector control unit B will be closed when no vacuum is being applied by the ejector 66 and will have an increased force of closing action against a positive flow of water or liquid from the ejector, to thus prevent water-flooding from the downstream side of the vacuum control chamber into its upstream side. Also, the pressure valve mechanism of the unit B, by opening and venting pressure fluid flow from its downstream to its upstream side, prevents the flow of treatment fluid from the primary control unit E into the ejector, except when it is moving from the unit B under a proper ejector-induced vacuum. The vacuum valve mechanism of the primary unit E is adapted to close when excessive vacuum is generated in the system, whether caused by an excessive ejector action or by the exhaustion of the supply of treatment fluid from the cylinder D. For example, the ejector unit B may be employed to provide a substantially constant vacuum of about 20 inches water column to the unit E, and the latter unit may be employed to give a substantially constant pressure drop to about 15 inches water column when treatment fluid is flowing from it to the unit B.

With reference to the graduated sight tube 52 of FIGURES 3 and 4, the flow rate of chlorine gas can be indicated in a conventional manner by the use of a metal or plastic ball or float therein.

As above indicated, in accordance with my invention, the chlorine which is being supplied from a pressure cylinder for treating the liquid such as water is taken off as a pressure flow from the cylinder as a gas over a liquid and is directly and immediately introduced or supplied to the negative pressure applying chamber of my control device, so that the chlorine is quickly or substantially instantaneously converted from a positive pressure flow to a negative pressure, suction or vacuum flow. The chlorine treating fluid is thereafter retained as a negative pressure flow and in a gaseous condition until it is introduced into the liquid or water being treated. I have eliminated tortuous or exposed paths of flow of the chlorine during its movement as a gas under pressure and thus, have been able to eliminate the use of heaters, filters, traps, etc. which further lengthen the flow path between the pressure cylinder and control means.

It will be apparent that the chlorine is supplied from the pressure cylinder or container D as a gas under positive pressure, such that when conveyed a substantial distance subject to a reduced or lowered ambient temperature, liquification or reliquification would normally result. By, as shown in FIGURES 1 and 2, directly and immediately conveying or flowing the gas under positive pressure from the container D into the control chamber of the unit E, or (as shown in FIGURES 1 and 2 of the drawings) through a path that does not substantially exceed the radius of the container, in other words, by limiting the length of the flow path from the pressure cylinder to the control chamber, I have been able to avoid any liquification of the gas during its positive pressure flow movement to the control chamber. Since the gas is immediately converted to a negative pressure flow in the control chamber, it is of such a value that it is no longer sensitive to a lowering or reduction of the ambient temperature in its subsequent flow to the ejector or to the liquid being treated.

The common practice previous to my invention has been to connect the pressure or supply cylinder to a chlorinating system by means of flexible connections, such as copper tubing, and by means of a manifold which is usually constructed of copper, brass, wrought iron or steel. Such metals easily corrode in a moist chlorine atmosphere and dirt caused by corrosion tends to foul the system. If re-liquification of the chlorine gas occurs, as caused by a minor temperature drop, this accentuates the dirt problem, since the gas turns into a state where it is similar to moist steam or a liquid, such that it tends to break loose dirt and force it into chlorinating mechanism. I have found that tortuous and indirect paths or flow of the chlorine gas while under positive pressure from the supply cylinder should be avoided, as incident to the use of flexible tubing connections, manifolds, filters, rate indicators, rate control valves, etc., and this is particularly true, since condensation or re-liquification of the chlorine will occur under such conditions where the ambient temperature is below the temperature-pressure equilibrium indicated in the vapor pressure curve for chlorine. A drop of a few degrees of the ambient temperature will have little effect on the chlorine cylinder because of its mass, but the manifold or flexible connections will cool quickly since they are of low mass and contain the chlorine gas. Since the pressure is substantially constant, the chlorine gas will tend to re-condense and thus cause difficulties in the system. Attempts have been made to avoid re-liquification by adding heat to the system.

The withdrawal rate from a single 100 to 150 pound supply cylinder is ordinarily about 1¾ pounds per hour or 42 pounds per day and this discharge can be effected against a pressure of about 35 p.s.i.g. without sweating. Sweating tends to produce the formation of frost crystals on the connections. If sweating can be permitted, the rate can be doubled which will give up to about 84 pounds per day for a discharge to 35 p.s.i.g. Conventional connections are usually 4 to 6 feet long and use tubing of ⅜ to ⅛ inch in diameter.

In accordance with my invention, I have no concern with sweating and thus can double the rate of supply and can easily withdraw continuously from a single cylinder more than 100 pounds of chlorine within 24 hours. In fact, I placed a chlorinator constructed in accordance with my invention out of doors during the winter season when the temperature was about 20° F. and the unit operated successfully through a blizzard and snow storm where the temperature went down to −5° F. Thus, my invention makes possible safely employing an installation out of doors, even during the winter months, without the use of heating means, the practical elimination of all corrosion and dirt problems, and the provision of a simplified installation which the average operator can understand and easily take care of. Without my invention, even a minor reduction of ambient temperature will cause reliquification of the gas and attendant difficulties incident thereto. I eliminate the need for filters and heating equipment in connections between the chlorinator and the pressure cylinder and, by such elimination, make possible a direct and immediate connection of the unit with respect to the pressure cylinder, a substantially minimized exposure of the chlorine gas to ambient temperature changes while flowing as a pressure flow, and a substantial immediate or instantaneous conversion of such flow into a negative pressure flow which is not adversely effected by ambient temperatures.

While I have shown a preferred embodiment of my invention, it will be understood that various changes may be made in its construction and utilization by those skilled in the art without departing from the spirit of the invention as defined in the appended claims.

What I claim is:

1. An improved procedure for chemically-treating a liquid such as water wherein, chlorine in fully gaseous form is supplied from a pressure cylinder containing chlorine as a gas over a liquid to and through an automatic control device that has an inlet fitting for receiving the chlorine from the pressure cylinder, that has an outlet portion, and that has a control chamber therein connected between the inlet fitting and the outlet portion for delivering the chlorine through the outlet portion into the liquid being treated which comprises, directly and immediately flowing the chlorine as a gas under positive pressure from the pressure cylinder through the inlet fitting into the control chamber at such a pressure that when conveyed through a substantial distance subject to a reduced ambient temperature, liquification thereof would result, applying negative pressure through the outlet portion to the control chamber, making the applied negative pressure the more effective and thereby converting the pressure flow of the chlorine in gaseous form within the control chamber into a negative pressure flow in gaseous form of a value such that liquification of the gas at the reduced ambient temperature will be avoided, and flowing the gas out of the outlet portion thereof and into the liquid being treated, maintaining the pressure flow of the chlorine in gaseous form from the pressure cylinder to the inlet fitting by limiting the maximum length of the flow path from the pressure cylinder to the control chamber to an amount that does not substantially exceed the radius of the cylinder and in a sealed-off relationship with the surrounding atmosphere and in the fully gaseous condition by the defined direct and immediate flowing of the chlorine from the pressure cylinder through the inlet fitting to the control chamber, closing-off the positive pressure flow of the chlorine in gaseous form through the inlet fitting into the control chamber when the positive pressure of the chlorine being supplied in gaseous form to the inlet fitting is lowered and negative pressure is being applied through the outlet portion to the control chamber, and closing-off the flow of chlorine in gaseous form under positive pressure through the inlet fitting into the control chamber when no negative pressure is being applied to the outlet portion.

2. An improved procedure for chemically-treating a liquid such as water wherein, chlorine in fully gaseous form is supplied from a pressure cylinder containing chlorine as a gas over a liquid to and through an automatic control device that has an inlet fitting for receiving the chlorine from the pressure cylinder, that has an outlet portion, and that has a control chamber therein connected between the inlet fitting and the outlet portion for delivering the chlorine through the outlet portion into the liquid being treated which comprises, directly and immediately flowing the chlorine as a gas under positive pressure from the pressure cylinder through the inlet fitting into the control chamber at such a pressure that when conveyed through a substantial distance subject to a reduced ambient temperature, liquification thereof would result, applying negative pressure through the outlet portion to the control chamber, making the applied negative pressure the more effective and thereby converting the pressure flow of the chlorine in gaseous form within the control chamber into a negative pressure flow in gaseous form of a value such that liquification of the gas at the reduced ambient temperature will be avoided, and flowing the gas out of the outlet portion thereof and into the liquid being treated, maintaining the pressure flow of the chlorine in gaseous form from the pressure cylinder to the inlet fitting by limiting the maximum length of the flow path from the pressure cylinder to the control chamber to an amount that does not substantially exceed the radius of the cylinder and in a sealed-off relationship with the surrounding atmosphere and in the fully gaseous condition by the defined direct and immediate flowing of the chlorine from the pressure cylinder through the inlet fitting to the control chamber; closing-off the positive pressure flow of the chlorine in gaseous form through the inlet fitting into the control chamber when the positive pressure of the chlorine being supplied in gaseous form to the inlet fitting is lowered and negative pressure is being applied through the outlet portion to the control chamber; and independently closing-off the flow of chlorine in gaseous form under positive pressure through the inlet fitting into the control chamber when no negative pressure is being applied to the outlet portion, both when the chlorine gas is not being supplied and is being supplied under positive pressure to the inlet fitting.

3. An improved procedure for chemically-treating a liquid such as water wherein, chlorine in fully gaseous form is supplied from a pressure cylinder containing chlorine as a gas over a liquid to and through an automatic control device that has an inlet fitting for receiving the chlorine from the pressure cylinder, that has an outlet portion, and that has a control chamber therein connected between the inlet fitting and the outlet portion for delivering the chlorine through the outlet portion into the liquid being treated which comprises, directly and immediately flowing the chlorine as a gas under positive pressure from the pressure cylinder through the inlet fitting into the control chamber at such a pressure that when conveyed through a substantial distance subject to reduced ambient temperature, liquification thereof would result, applying negative pressure through the outlet portion to the control chamber, making the applied negative pressure the more effective and thereby converting the pressure flow of the chlorine in gaseous form within the control chamber into a negative pressure flow in gaseous form of a value such that liquification of the gas at the reduced ambient temperature will be avoided, and flowing the gas out of the outlet portion thereof and into the liquid being treated, maintaining the pressure flow of the chlorine in gaseous form from the pressure cylinder to the inlet fitting by limiting the maximum length of the flow path from the pressure cylinder to the control chamber to an amount that does not substantially exceed the radius of the cylinder and in a sealed-off relationship with the surrounding atmosphere and in the fully gaseous condition and substantially irrespective of a lowering of the temperature of the ambient atmosphere by the defined direct and immediate flowing of the chlorine from the pressure cylinder through the inlet fitting to the control chamber; closing-off the positive pressure flow of the chlorine in gaseous form through the inlet fitting into the control chamber when the positive pressure of the chlorine being supplied in gaseous form to the inlet fitting is lowered and negative pressure is being applied through the outlet portion to the control chamber; closing-off the flow of chlorine in gaseous form under positive pressure throgh the inlet fitting into the control chamber when no negative pressure is being applied to the outlet portion, both when the chlorine gas is not being supplied and is being supplied under positive pressure to the inlet fitting; and independently closing-off fluid flow between the outlet portion and the liquid being treated when the positive pressure of the fluid being supplied to the inlet fitting is lowered and negative pressure is being applied to the outlet portion.

4. An improved procedure as defined in claim 3, including the additional step of venting the outlet portion to the atmosphere when fluid flow is independently closed-off between the outlet portion and the liquid being treated.

5. An improved procedure for chemically-treating a liquid such as water with chlorine supplied from an outlet fitting of a pressure cylinder containing chlorine as a gas over a liquid by the use of a flow-control device having an inlet fitting for receiving the chlorine from the outlet fitting, having an outlet portion, and having a control chamber therein connected between the inlet fitting and the outlet portion for delivering the chlorine into the liquid being treated which comprises, directly and immediately flowing the chlorine under positive pressure as a gas from the outlet fitting through the inlet fitting into the control chamber at such a pressure that when conveyed through a substantial distance subject to reduced ambient temperature, liquification thereof would result, maintaining the pressure flow of the chlorine in gaseous form from the pressure cylinder through the fittings and into the control chamber in a sealed-off relation with the surrounding atmosphere and in a gaseous condition by limiting the maximum length of the flow path from the pressure cylinder to the control chamber to an amount that does not substantially exceed the radius of the cylinder, applying negative pressure through the outlet portion to the control chamber and making it the more effective, thereby converting the pressure flow of the chlorine in gaseous form to the control chamber into a negative pressure flow in gaseous form of a value such that liquification of the gas at the reduced ambient temperature will be avoided, and flowing the gas from the control chamber out of the outlet portion and into the liquid being treated.

6. An improved procedure for chemically-treating a liquid such as water with chlorine supplied from an outlet fitting of a pressure cylinder containing chlorine as a gas over a liquid by the use of flow control device having an inlet fitting for receiving the chlorine from the outlet fitting, having an outlet portion, and having a control chamber therein connected between the inlet fitting and the outlet portion which comprises, directly and immediately flowing the chlorine under positive pressure as a gas from the outlet fitting of the pressure cylinder in a sealed-off relation through the inlet fitting into the control chamber at such a pressure that when conveyed through a substantial distance subject to a reduced ambient temperature, liquification thereof would result, maintaining the pressure flow of the chlorine in gaseous form from the pressure cylinder through the fittings into the control chamber in a sealed-off relation with the ambient atmosphere and in a gaseous condition substantially irrespective of a lowering of the ambient temperature by limiting the maximum length of the flow path from the pressure cylinder to the control chamber to an amount that does not substantially exceed the radius of the cylinder, applying negative pressure through the outlet portion to the control chamber and making it the more effective, thereby converting the pressure flow of the chlorine in gaseous form to the control chamber into a negative pressure flow in gaseous form in the control chamber of a value such that liquification of the gas at the reduced ambient temperature will be avoided, and flowing the gas out of the outlet portion and into the liquid being treated; closing-off the flow of chlorine to the control chamber when no negative pressure is being applied to the outlet portion, and closing-off the flow of the chlorine to the control chamber when the positive pressure of the chlorine being supplied in gaseous form thereto is lowered and negative pressure is being applied through the outlet portion to the control chamber.

7. A method of supplying chlorine in gaseous form to the throat of an ejector from an outlet of a high pressure container at which the chlorine is in a combined liquid and gaseous phase at such a pressure that when conveyed through a substantial distance subject to a reduced ambient temperature, liquification thereof would result which comprises the steps of, progressively flowing the chlorine in the gaseous form under positive pressure from the outlet of the container, directly-converting the positive pressure flow of the chlorine in gaseous form into a negative pressure flow in gaseous form immediately adjacent the outlet of a value such that liquification of the gas at the reduced ambient temperature will be avoided, and then immediately metering the negative pressure flow before supplying the chlorine in gaseous form to the throat of the ejector, all while maintaining the flow of the chlorine gas in a sealed-off relation with the ambient atmosphere and carrying out the steps in such a manner as to fully retain the gaseous form of the progressive flowing chlorine during its movement from the outlet of the container into the throat of the ejector and under conditions involving a lowered ambient temperature by limiting the maximum length of the flow path from the container to the point of conversion of the gas to a negative pressure to an amount that does not substantially exceed the radius of the container.

8. In apparatus for controlling the supply of chemical treatment fluid from a valve outlet of a pressure cylinder to condition a liquid and wherein chlorine as a gas over liquid is contained in the pressure cylinder at a pressure such that when conveyed over a substantial distance subject to a lowered ambient temperature, liquification thereof would result which comprises, a control unit mounted on the valve outlet of the pressure cylinder, conduit means communicating said control unit with the pressure cylinder through a flow path having a distance that does not substantially exceed the radius of the pressure cylinder, said control unit having a housing defining a fluid-control chamber therein, a pressure-sensitive diaphragm within said housing dividing the control chamber into a higher pressure side and a lower pressure side, a fluid outlet portion and a fluid inlet portion carried by said housing, a valve passageway connecting said fluid inlet portion to the lower pressure side of said chamber for passing the chemical treatment fluid to the lower pressure side when it is flowing under positive pressure from the pressure cylinder, said fluid outlet portion being connected to the lower pressure side of the chamber, valve means within said valve passageway, resilient means cooperating with the positive pressure of the chemical treatment fluid to urge said valve means to a position closing-off said passageway, said diaphragm being operatively connected to said valve means for effecting movement of said valve means in opposition to said resilient means and the positive pressure of the chemical treatment fluid to open said passageway on application of negative pressure to said fluid outlet portion to draw fluid through said fluid inlet portion along said passageway into the lower pressure side of said chamber and out of said fluid outlet portion to the liquid, said control unit being constructed and arranged to convert the positive pressure gas to a negative pressure gas of a value such that liquification thereof will be avoided when it is subjected to the lowered ambient temperature, position-change means operatively-associated with said diaphragm, and indicator means actuated by movement of said position-change means in a direction away from said indicator means to indicate a fall of positive pressure at which the treatment fluid is supplied from the pressure cylinder through said inlet portion.

9. In apparatus for controlling the supply of chemical treatment fluid from a valve outlet of a pressure cylinder to condition a liquid which comprises, a control unit having a housing defining a fluid-control chamber therein, a pressure-sensitive diaphragm within said housing dividing the control chamber into a higher pressure side and a lower pressure side, a fluid outlet portion and a fluid inlet portion carried by said housing, a valve passageway connecting said fluid inlet portion to the lower pressure side of said chamber for passing the chemical treatment fluid to the lower pressure side when it is flowing under positive pressure from the pressure cylinder, said fluid outlet portion being connected to the lower pressure side of the chamber, valve means within said valve passageway, resilient means cooperating with the positive pressure of the chemical treatment fluid to urge said valve means to a position closing-off said passageway, said diaphragm being operatively connected to said valve means for effecting movement of said valve means in opposition to said resilient means and the positive pressure of the chemical treatment fluid to open said passageway on application of negative pressure to said fluid outlet portion to draw fluid through said fluid inlet portion along said passageway into the lower pressure side of said chamber and out of said fluid outlet portion to the liquid, position-change means operatively-associated with said diaphragm, and indicator means actuated by movement of said position-change means in a direction away from said indicator means to indicate a fall of positive pressure at which the treatment fluid is supplied from the pressure cylinder through said inlet portion; said indicator means comprising, a slide member operatively positioned to move inwardly and outwardly through said housing, a swing indicator arm operatively positioned on an outer face of said housing and adapted to engage an outer end portion of said slide member, and means to swing said arm from one position to a second position when said slide member is moved inwardly with respect to said housing.

10. Apparatus for controlling the supply of chemical treatment fluid from a valve outlet of a pressure cylinder to condition a liquid and wherein chlorine as a gas over liquid is contained in the pressure cylinder at a pressure such that when conveyed over a substantial distance subject to a lowered ambient temperature, liquification thereof would result which comprises, a control unit mounted on the valve outlet of the pressure cylinder, conduit means communicating said control unit with the pressure cylinder through a flow path having a distance that does not substantially exceed the radius of the pressure cylinder, said control unit having a housing defining a control chamber therein, fluid inlet and outlet portions carried by said housing, a pressure-sensitive diaphragm dividing said control chamber into a higher pressure side and a lower pressure side, a valve passageway connecting said inlet portion and the lower pressure side of said chamber, said fluid outlet portion being connected to the lower pressure side of said chamber, valve means within said valve passageway, resilient means urging said valve means to a position closing-off said passageway, said diaphragm being operatively carried by said housing and connected to said valve means in opposition to said resilient means to open said passageway on application of negative pressure to said fluid outlet portion for drawing fluid through said fluid inlet portion along said valve means and said valve passageway into the lower pressure side of said chamber and out of said fluid outlet portion to the liquid, said diaphragm having a second valve means operated by an increase of negative pressure application to said fluid outlet portion to seat about said valve passageway and close-off flow of fluid therethrough, and said diaphragm being sensitive to a fall-off of pressure of the treatment fluid being supplied through said inlet portion to move said second valve means into a fully closing-off position with said valve passageway, said control unit being constructed and arranged to convert the positive pressure gas to a negative pressure gas of a value such that liquification thereof will be avoided when it is subjected to the lower ambient temperature.

11. Apparatus as defined in claim 10 wherein, a control rate indicating means is mounted on said housing, a second passageway is connected between said fluid outlet portion and the lower pressure side of said chamber through said flow rate indicating means, and a regulator valve is operatively positioned in said second passageway to regulate the rate of flow of treatment fluid to said outlet portion.

12. Apparatus as defined in claim 10 wherein, said second valve means comprises, a seat carried on an inner face of said housing that defines the lower pressure side of said chamber and through which said valve passageway extends, and a seating valve rim carried by said diaphragm to engage said seat, and said resilient means is interposed in the lower pressure side of the control chamber in operative association with said diaphragm to urge said seating valve rim away from engagement with said seat.

13. Apparatus as defined in claim 10 wherein indicator means is operatively associated with said diaphragm and and movable within said housing to indicate the closing-off of said second valve means to an operator.

14. Apparatus for controlling the supply of chemical treatment fluid from a valve outlet of a pressure cylinder to condittion a liquid and wherein chlorine as a gas over liquid is contained in the pressure cylinder at a pressure such that when conveyed over a substantial distance subject to a lowered ambient temperature, liquification thereof would result which comprises, a control unit mounted on the valve outlet of the pressure cylinder, conduit means communicating said control unit with the pressure cylinder through a flow path having a distance that does not substantially exceed the radius of the pressure cylinder, said control unit having an assembly of parts defining a fluid-control chamber therein, a flexible diaphragm operatively positioned between said control-chamber-defining parts across said chamber dividing it into a higher pressure side and a lower pressure side, a passageway at all times connecting the higher pressure side through said housing to the atmoshphere, fluid inlet and outlet portions carried by said control unit, a valve passageway connecting said fluid inlet portion to the lower pressure side to deliver treatment fluid from the valve outlet thereto, a fluid-flow indicating sight tube mounted on said control unit adjacent the higher pressure side of said control chamber, a primary outlet passageway connecting the lower pressure side of said chamber to one end of said sight tube, a second outlet passageway connected between an opposite end of said sight tube and said outlet portion, a metering valve operatively positioned in said second outlet passageway to regulate fluid from said sight tube to said outlet portion, and said control unit being constructed and arranged to convert the positive pressure gas to a negative pressure gas of a value such that liquification thereof will be avoided when it is subjected to the lowered ambient temperature.

15. A fluid control system employing a pressure cylinder having an outlet portion for supplying chlorine under positive pressure in gaseous form and employing an ejector for deliverying the chlorine under negative pressure in gaseous form into a liquid to be chemically-treated such as water, while maintaining the chlorine in gaseous form during its movement from the pressure cylinder into the liquid, wherein chlorine as a gas over liquid is contained in the pressure cylinder at a pressure such that when conveyed over a substantial distance subject to a lowered ambient temperature, liquification thereof would result which comprises, a flow-control device defining a fluid-control chamber therein, an outlet fitting secured to the outlet portion of the pressure cylinder, an inlet fitting cooperating with said outlet fitting to provide a sealed-off joint therebetween and support said flow-control device on the pressure cylinder, said pair of fittings defining a flow path therealong having a distance that does not substantially exceed the radius of the pressure cylinder for supplying the chlorine under positive pressure to said chamber while retaining the chlorine in gaseous form and substantially irrespective of a lowering of the temperature of the ambient atmosphere by the defined flow path, a pressure-sensitive diaphragm dividing said chamber into a higher pressure side and a lower pressure side, a fluid outlet portion carried by said device and connected to the lower pressure side of said chamber, said inlet passageway being also connected to the lower pressure side of said chamber, valve means operatively-positioned within said inlet passageway and having means normally urging it to a position fully closing-off said passageway, said diaphragm being operatively-carried by said device and connected to said valve means in opposition to said urging means to move said valve means from its fully closed position and open said inlet passageway on an application of negative pressure to said fluid outlet portion for flowing the chlorine under negative pressure and in gaseous form through said device and out of said outlet portion at such a value that liquification of the gas will be avoided when it is subjected to the lowered ambient temperature, said diaphragm having a second valve means adapted to seat about said inlet passageway, and said diaphragm being sensitive to a fall-off of positive pressure of the chlorine being supplied through said inlet passageway to move said second valve means into a fully seated position about said inlet passageway.

16. A fluid control system employing a pressure cylinder having an outlet portion for supplying chlorine under positive pressure in gaseous form and employing an ejector for delivering the chlorine under negative pressure in gaseous form into a liquid to be chemically-treated such as water, while maintaining the chlorine in gaseous form during its movement from the pressure cylinder into the liquid which comprises, a flow-control device defining a fluid-control chamber therein, an outlet fitting secured to the outlet portion of the pressure cylinder, an inlet fitting cooperating with said outlet fitting to provide a sealed-off joint therebetween and support said flow-control device on the pressure cylinder, said pair of fittings defining an inlet passageway therealong for supplying the chlorine under positive pressure to said chamber while retaining the chlorine in gaseous form and substantially irrespective of a lowering of the temperature of the ambient atmosphere, a pressure-sensitive diaphragm dividing said chamber into a higher pressure side and a lower pressure side, a fluid outlet portion carried by said device and connected to the lower pressure side of said chamber, said inlet passageway being also connected to the lower pressure side of said chamber, valve means operatively-positioned within said inlet passageway and having means normally urging it to a position closing-off said passageway, said diaphragm being operatively-carried by said device and connected to said valve means in opposition to said urging means to open said inlet passageway on a application of negative pressure to said fluid outlet portion for flowing the chlorine under negative pressure and in gaseous form through said device and out of said outlet portion, said diaphragm having a second valve means adapted to seat about said inlet passageway, said diaphragm being sensitive to a fall-off of positive pressure of the chlorine being supplied through said inlet passageway to move said second valve means into a fully seated position about said inlet passageway, said diaphragm having a stem portion projecting therefrom through said housing, said stem portion being moved inwardly when said second valve means is moved into its fully seated position, visual indicating means operatively positioned on said housing and having force exerting means for normally urging it in one direction, said stem portion being constructed to latch-engage said visual indicating means when in a maximum outward position with respect to said housing to hold said visual indicating means in one position against the force exerted by said force exerting means, and said stem portion being constructed to release said visual indicating means and permit movement thereof by said force exerting means when said stem portion has been moved inwardly from its maximum outer position by the movement of said second valve means into its fully seated position.

17. A fluid control system employing a pressure cylinder having an outlet portion for supplying chlorine under positive pressure in gaseous form and employing an ejector for delivering the chlorine under negative pressure in gaseous form to a liquid such as water while retaining the chlorine in gaseous form during its movement from the pressure cylinder to the liquid which comprises, a flow-control device defining a fluid control chamber therein, an outlet fitting secured to the outlet portion of the pressure cylinder, an inlet fitting cooperating with said outlet fitting to provide a sealed-off joint therebetween, means for detachably-securely supporting said flow control device on said outlet fitting and simultaneously detachably-securing said inlet fitting in an aligned sealed-off joined relation with said outlet fitting, a pressure-sensitive diaphragm dividing said chamber into a higher pressure side and a lower pressure side, said pair of fittings defining a direct inlet flow passageway therealong for immediately supplying the chlorine under positive pressure to the lower pressure side of said chamber while retaining the chlorine in gaseous form, a fluid outlet portion carried by said device, flow indicating means connected between said fluid outlet portion and the lower pressure side of said chamber adapted to visually indicate the rate of flow of fluid from said chamber to said fluid outlet portion, valve means operatively-positioned within said inlet passageway and having resilient means normally urging it to a position closing-off said passageway, said diaphragm being operatively-carried by said device and connected to said valve means in opposition to said resilient means to open said inlet passageway on an application of negative pressure to said fluid outlet portion for flowing the chlorine under negative pressure and in gaseous form through said lower pressure side of said chamber and out of said outlet portion, said diaphragm having a second valve means to seat about said inlet passageway and being normally urged by said resilient means to an open position with respect to said inlet passageway, and said diaphragm being sensitive to a fall-off positive pressure of the chlorine being supplied through said inlet passageway to move said second valve means against the force exerted by said resilient means to a fully closed-off position with said inlet passageway and being sensitive to an increase of negative pressure from said outlet portion to also move said second valve means against the force exerted by said resilient means to a fully closed-off position with said inlet passageway.

18. A fluid control system employing a pressure cylinder having an outlet portion for supplying chlorine under positive pressure in gaseous form and employing an ejector for delivering the chlorine under negative pressure in gaseous form into a liquid to be chemically-treated such as water, while maintaining the chlorine in gaseous form during its movement from the pressure cylinder into the liquid which comprises, a flow-control device defining a fluid-control chamber therein, an outlet fitting secured to the outlet portion of the pressure cylinder, an inlet fitting cooperating with said outlet fitting to provide a sealed-off joint therebetween and support said flow-control device thereon, said pair of fittings defining an inlet passageway therealong for immediately supplying the chlorine under positive pressure to said chamber while retaining the chlorine in gaseous form, a pressure-sensitive diaphragm dividing said chamber into a higher pressure side and a lower pressure side, a fluid outlet portion carried by said device and connected to the lower pressure side of said chamber, said inlet passageway being also connected to the lower pressure side of said chamber, valve means operatively-positioned within said inlet passageway and having means normally urging it to a position closing-off said passageway, said diaphragm being operatively-carried by said device and connected to said valve means in opposition to said urging means to open said inlet passageway on an application of negative pressure to said fluid outlet portion for flowing the chlorine under negative pressure and in gaseous form through said device and out of said outlet portion, said diaphragm having a second valve means adapted to seat about said inlet passageway, said diaphragm being sensitive to a fall-off of positive pressure of the chlorine being supplied through said inlet passageway to move said second valve means into a fully seated position about said inlet passageway, a secondary flow-control device adapted to cooperate with the injector for supplying chlorine under negative pressure to the liquid, said secondary device having a control chamber therein, said secondary device having a combined negative pressure outlet and chlorine gas inlet portion connecting its said control chamber to said fluid outlet portion of said first-mentioned flow-control device, said secondary device having a negative-pressure-sensitive valve means to close-off flow of chlorine gas from said fluid outlet portion of said first-mentioned device when negative pressure produced by flow of water through the injector is reduced, and said diaphragm of said first-mentioned device being constructed to open its said valve means and effect a flow of the chlorine under negative pressure in gaseous form into said control chamber of said secondary device when full negative pressure is being applied by said secondary device to said fluid outlet portion of said first-mentioned device.

19. Apparatus for controlling the supply of chemical treatment fluid from a valve outlet of a pressure cylinder to condition a liquid which comprises, a control unit having a housing defining a control chamber therein, fluid inlet and outlet portions carried by said housing, a pressure-sensitive diaphragm dividing said control chamber into a higher pressure side and a lower pressure side, a valve passageway connecting said inlet portion and the lower pressure side of said chamber, said fluid outlet portion being connected to the lower pressure side of said chamber, valve means within said valve passageway, resilient means urging said valve means to a position closing-off said passageway, said diaphragm being operatively carried by said housing and connected to said valve means in opposition to said resilient means to open said passageway on application of neagtive pressure to said fluid outlet portion for drawing fluid through said fluid inlet portion along said valve means and said valve passageway into the lower pressure side of said chamber and out of said fluid outlet portion to the liquid, said diaphragm having a second valve means operated by an increase of negative pressure application to said fluid outlet portion to seat about said valve passageway and close-off flow of fluid therethrough, said diaphragm being sensitive to a fall-off of pressure of the treatment fluid being supplied through said inlet portion to move said second valve means into a fully closing-off position with said valve passageway; said indicator means being operatively associated with said diaphragm and movable within said housing to indicate the closing-off of said second valve means to an operator; said indicator means comprising, a slide member operatively positioned within said housing to move inwardly and outwardly therethrough, a swing indicator arm operatively positioned on an outer face of said housing and constructed to engage an outer end portion of said slide member, and means to swing said arm from one position to a second position when said slide member is moved inwardly during the closing movement of said second valve means.

References Cited by the Examiner
UNITED STATES PATENTS

| | | | |
|---|---|---|---|
| 1,285,496 | 11/1918 | Wallace et al. | 137—98 |
| 2,359,111 | 9/1944 | Hughes | 137—505.41 X |
| 2,778,223 | 1/1957 | Kimbrell | 137—557 X |
| 3,029,836 | 4/1962 | Gruner | 137—557 |
| 3,030,974 | 4/1962 | Arenhold | 137—100 |
| 3,100,496 | 8/1963 | Reiser | 137—557 X |

ISADOR WEIL, *Primary Examiner.*

UNITED STATES PATENT OFFICE
CERTIFICATE OF CORRECTION

Patent No. 3,220,430                      November 30, 1965

James F. Haskett

It is hereby certified that error appears in the above numbered patent requiring correction and that the said Letters Patent should read as corrected below.

Column 3, line 51, for "exhausting" read -- exhaustion --; column 4, line 26, for "claamping" read -- clamping --; column 8, line 74, after "part" insert -- 88 --; column 10, line 39, for "or" read -- of --; column 16, line 34, for "condittion" read -- condition --; column 20, line 10, for "neagtive" read -- negative --.

Signed and sealed this 20th day of September 1966.

(SEAL)
Attest:

ERNEST W. SWIDER                      EDWARD J. BRENNER
Attesting Officer                          Commissioner of Patents